United States Patent [19]
Morita et al.

[11] Patent Number: 5,811,136
[45] Date of Patent: Sep. 22, 1998

[54] SCREW-IN-PLUNGER INJECTION APPARATUS

[75] Inventors: Ryozo Morita; Tadashi Hasegawa, both of Nagoya; Yoshimitsu Tabata; Shigemi Kushida, both of Tokai; Shinichi Nakamura, Handa, all of Japan

[73] Assignees: Kabushiki Kaisha Meiki Seisakusho; Aronkasei Co., Ltd., both of Japan

[21] Appl. No.: 755,329

[22] Filed: Nov. 21, 1996

[30] Foreign Application Priority Data

Nov. 22, 1995 [JP] Japan ................................... 7-304571
Nov. 14, 1996 [JP] Japan ................................... 8-302993

[51] Int. Cl.⁶ .................................................. B29C 45/50
[52] U.S. Cl. ........................ 425/190; 425/547; 425/550; 425/574; 425/586
[58] Field of Search ............................... 425/131.1, 190, 425/547, 550, 586, 574

[56] References Cited

U.S. PATENT DOCUMENTS 4,767,306   8/1988   Kawaguchi et al. ................ 425/586
4,799,874   1/1989   Bellmar et al. ..................... 425/131.1

FOREIGN PATENT DOCUMENTS 46-2909     1/1971   Japan.
60-171319  11/1985   Japan.

*Primary Examiner*—Tim Heitbrink
*Attorney, Agent, or Firm*—Parkhurst & Wendel LLP

[57] ABSTRACT

A screw-in-plunger injection apparatus is provided which is advantageously used for molding either a large-size or a small-size product. The injection apparatus is capable of selectively carrying out a plunger-type injection operation and an inline-screw-type injection operation. In the plunger-type injection operation, an injection plunger 12 and a screw 10 are advanced in an injection cylinder 14, so that a melted resin fed to a storage space provided on the side of one axial end of the injection plunger 12 is injected. In the inline-screw-type injection operation, a surface of the axial end of the injection plunger 12 is held in abutment with the injection cylinder 14, so that the storage space is reduced to provide a reduced storage space to and from which the melted resin is fed by the rotation of the screw and is injected by the movement of the screw in an axial direction thereof.

21 Claims, 9 Drawing Sheets

SCREW-IN-PLUNGER INJECTION APPARATUS

BACKGROUND OF THE INVENTION

1. Field of the Art

The present invention relates to a screw-in-plunger injection apparatus and in particular to a structurally improved screw-in-plunger injection apparatus which can successively mold, with stability, either a large-size product needing a large injection amount or a small-size product needing a small injection amount.

2. Statement of Related Art

Japanese Patent Application laid open for opposition purposes under Publication No. 46-2909 or Japanese Utility Model Application laid open for inspection purposes under Publication No. 60-171319 discloses a screw-in-plunger injection apparatus as an injection apparatus which produces a desired molding product by injecting a melted resin material into a molding cavity of a metal mold and filling the cavity with the resin material. In the disclosed screw-in-plunger injection apparatus, a screw is rotatably provided in a tubular injection plunger which is located in an injection cylinder, a resin material is fed to a storage space provided on the side of one axial end of the injection plunger, by the rotation of the screw, and both the injection plunger and the screw are advanced as a unit in an axial direction thereof in the injection cylinder, so that the resin material is injected from the storage space. In the prior injection apparatus, the inner diameter of the injection cylinder which defines the storage space (i.e., the outer diameter of the injection plunger) is designed to be so great that it is advantageously used for molding a large-size injection product needing a large amount of injection of resin material.

By the way, the screw-in-plunger injection apparatus cannot successively perform, with stability, a molding operation unless the respective strokes of movement of the injection plunger for the successive, actual molding operations fall within the range of 10 to 70% of the maximum movement amount of the injection plunger. If the movement amounts of the injection plunger are excessively small, the accuracy of control of injection amount and/or injection pressure may lower and accordingly the quality of injection products may lower. On the other hand, if the movement amounts of the injection plunger are excessively great, the amount of heat to melt the resin material may run short and accordingly the quality of injection products may lower. In either case, it is difficult for the injection apparatus to successively and stably perform the molding operations.

Thus, the prior injection apparatus suffers from the disadvantage that if an injection plunger having a large outer diameter is employed for molding a large-size injection product, the employment leads to lowering the performance to mold a small-size injection product needing a small injection amount. That is, it has been very difficult to provide a screw-in-plunger injection apparatus which can advantageously used for molding either a large-size product needing a large injection amount or a small-size product needing a small injection amount.

SUMMARY OF THE INVENTION

The present invention has been developed in the above-mentioned background, and has solved the problem of providing a structurally improved screw-in-plunger injection apparatus which can successively mold either a large-size product needing a large injection amount or a small-size product needing a small injection amount, with stability and with high accuracy of control of injection amount, etc., and the problem of providing a process of producing an injection molding product by using the screw-in-plunger injection apparatus.

The above problem has been solved according to a first aspect of the present invention, which provides a screw-in-plunger injection apparatus including an injection cylinder which has an inner hole, a tubular injection plunger which has an inner hole and a portion of which is located in the inner hole of the injection cylinder, and a screw which extends in the inner hole of the injection plunger such that the screw is rotatable to feed a resin material into a plunger-injection storage space provided on a side of one axial end of the injection plunger, the injection plunger and the screw being advanceable in an axial direction thereof in the inner hole of the injection cylinder to inject the resin material from the plunger-injection storage space, the injection apparatus being characterized in that the screw is movable relative to the injection plunger in the axial direction, that a drive device is provided which moves the screw relative to the injection plunger in the axial direction, that when the plunger is located at an advanced position thereof, a surface of the one axial end of the injection plunger tightly abuts on an inner surface of the injection cylinder, and that when the surface of the one axial end of the injection plunger abuts on the inner surface of the injection cylinder, the plunger-injection storage space is reduced to provide, on a side of an axial end of the screw, a reduced storage space to which the resin material is fed by the rotation of the screw and from which the resin material is injected by the advancement of the screw in the axial direction.

In the screw-in-plunger injection apparatus constructed as described above, in the state in which the surface of the one axial end of the injection plunger is held in abutment with the inner surface of the injection cylinder, the screw is rotated and is moved in the axial direction, so that an inline-screw-type injection molding is carried out.

That is, the screw-in-plunger injection apparatus in accordance with the present invention is capable of selectively carrying out the plunger-type injection operation in which the injection plunger and the screw are advanced in the injection cylinder so as to inject the resin material from the plunger-injection storage space, and the inline-screw-type injection operation in which the screw is rotated and is moved in the axial direction, under the state in which the injection plunger is held in abutment with the injection cylinder, so as to inject the resin material from the reduced storage space.

Since the screw provided in the injection plunger has an outer diameter smaller than that of the injection plunger, the inline-screw-type injection operation can be performed, even if the injection amount may be considerably small, with easy control of movement stroke of the screw, with high control accuracy, and with high molding stability. Thus, the present injection apparatus can successively mold, with stability and with high accuracy of control of injection amount, etc., either a large-size product needing a large injection amount or a small-size product needing a small injection amount, by selectively performing the plunger-type injection operation and the inline-screw-type injection operation.

In the screw-in-plunger injection apparatus in accordance with the present invention, the drive device which moves the screw has no limitation, but preferably has a structure in accordance with a first feature of the present invention.

According to the first feature of the present invention, the injection apparatus further comprises a movable base member which is fixed to the other axial end of the injection plunger which is opposite to the one axial end thereof, the movable base member being movable with the injection plunger relative to the injection cylinder, the movable base member supporting the drive device which moves the screw in the axial direction. The drive device may be a hydraulic cylinder device or an electric motor device.

In the injection apparatus in accordance with the first feature, the screw is advantageously moved by the drive device. In addition, a stopper device may be provided between the movable base member and the drive device, for defining an end of movement of the screw in the axial direction.

In the injection apparatus in accordance with the present invention, a drive device which moves the injection plunger has no limitation, but preferably has a structure in accordance with a second feature of the present invention in which a plurality of hydraulic cylinder devices which move the injection plunger relative to the injection cylinder in the axial direction, are provided between the injection plunger and the injection cylinder and around the injection plunger, the cylinder devices including respective piston rods which cooperate with each another to guide the movement of the screw in the axial direction.

In the injection apparatus in accordance with the second feature, the injection plunger is advantageously moved by the drive device provided by the hydraulic cylinder devices. In addition, the respective piston rods of the hydraulic cylinder devices are utilized as guide rails for guiding the movement of the screw in the axial direction. Thus, the stability of movement strokes of the screw is improved with the simple structure.

In the injection apparatus in accordance with the present invention, a ratio, Sa/Sb, of a cross-sectional area, Sa, of the inner hole of the injection cylinder to a cross-sectional area, Sb, of the inner hole of the injection plunger may be changed depending upon required performance. However, the injection apparatus preferably has a structure in accordance with a third feature of the present invention in which the ratio Sa/Sb is not smaller than 2 and not greater than 8.

In the injection apparatus in accordance with the present invention, a ratio, Qa/Qb, of a maximum volume of the plunger-injection storage space to a maximum volume, Qb, of the reduced storage space may be changed depending upon required performance. However, the injection apparatus preferably has a structure in accordance with a fourth feature of the present invention in which the ratio Qa/Qb is not smaller than 3 and not greater than 10.

In the case where the cross-sectional area ratio (Sa/Sb) in accordance with the third feature or the storage volume ratio (Qa/Qb) in accordance with the fourth feature is employed, the present injection apparatus can perform an excellent injection molding within an extremely wide range of needed injection amount, by selectively carrying out the plunger-type injection operation and the inline-screw-type injection operation. More specifically described, if the ratio Sa/Sb is not smaller than 2, then a great amount of melted resin can be stored and molded by using a small-size injection plunger. If the ratio Qa/Qb is not smaller than 3, then the injection apparatus can be used with a wide range of needed injection amount (volume of the molding cavity), so that the present apparatus enjoys an excellent economical effect and a high cost performance. In addition, if the ratio Sa/Sb is not greater than 8 or if the ratio Qa/Qb is not greater than 10, then the resin material is prevented from remaining in the plunger-injection storage space for an excessively long time, or an excessively long distance is prevented from occurring between the core of the stored resin and an external heater for controlling the temperature thereof. Consequently an excessively great temperature difference is prevented from occurring between the leading and trailing portions of the stored resin or between the core and peripheral portions of the same. Thus, the present apparatus can perform a more stable molding. Moreover, if the ratio Sa/Sb is not greater than 8 or if the ratio Qa/Qb is not greater than 10, then the cycle time is prevented from excessively increasing because of excessive increasing of the time needed to fill, with the resin material, the plunger-injection storage space which otherwise would have an excessively great volume. Thus, the present apparatus enjoys an excellent molding performance and a high cost performance.

According to a fifth feature of the invention, the injection apparatus has a structure in which an axial end portion of the injection plunger which is located in the inner hole of the injection cylinder has a first helical groove formed in an outer circumferential surface thereof, and a micro sheath heater is provided in the first helical groove.

If the structure in accordance with the fifth feature is employed, then the axial end portion of the injection plunger located in the injection cylinder can directly be heated by the micro sheath heater, so that the heating, and temperature control, of the resin material fed to the plunger-injection storage space through the injection plunger may be carried out with accuracy and stability. In addition, since the micro sheath heater is provided in the helical groove formed in the outer circumferential surface of the axial end portion of the injection plunger, the heater does not project from the outer circumferential surface or interfere with the insertion of the injection plunger into the injection cylinder. Rather, the heater can advantageously and uniformly heat, and control the temperature of, the axial end portion of the injection plunger over a long range thereof in the axial direction. However, the pitch of the first helical groove can be changed in the axial length of the injection plunger, so that the amount of heat applied to the plunger may be adjusted in the axial length thereof in consideration of the change of heating efficiency of the plunger in the axial length thereof.

In the case where the injection plunger is directly heated by the micro sheath heater, a band heater may simultaneously be provided on an outer circumferential surface of the injection cylinder, so that the plunger may be heated by the heat conducted from the cylinder. The micro sheath heater is defined as a wire-like electric heat generator having a structure in which a heat-generating electric wire extends in a small-diameter pipe filled with an electrically insulating powder.

In a first preferred form in accordance with the fifth feature in which the axial end portion of the injection plunger is heated by the micro sheath heater, a band heater is provided on an outer circumferential surface of a remaining portion of the injection plunger other than the axial end portion thereof. In this case, the injection plunger can be heated and temperature-controlled with advantage over an entire length thereof.

In a second preferred form in accordance with the fifth feature in which the micro sheath heater is helically wound around the outer circumferential surface of the axial end portion of the injection plunger, a protect sleeve is externally fit on the axial end portion of the injection plunger to protect the micro sheath heater. In this case, the micro sheath heater is prevented from being damaged because of the coming of the heater off the helical groove, the trapping of the resin material between the injection plunger and the injection cylinder, etc. Thus, the present apparatus enjoys improved life expectancy. In addition, the plunger can be moved relative to the cylinder with improved degree of smoothness.

The present apparatus may comprise at least one micro sheath heater. However, in a third preferred form in accordance with the fifth feature, the axial end portion of the injection plunger has a plurality of first helical grooves, and a plurality of micro sheath heaters are provided in the plurality of first helical grooves, respectively.

In the above-indicated third preferred form in which the plurality of micro sheath heaters are provided, the degree of freedom of heating control is largely improved by controlling the application of electric power to each of the micro sheath heaters. In addition, one or more of the plurality of micro sheath heaters may be reserved as a spare heater or heaters. In the latter case, even if one or more micro sheath heaters may break, the application of electric power is just switched from the dead heater or heaters to the spare heater or heaters, to continue injection molding operations, without needing any exclusive repairing operation such as replacing of the dead heaters with the spare ones.

In a fourth preferred form in accordance with the fifth feature in which the micro sheath heater is provided in the first helical groove formed in the outer circumferential surface of the axial end portion of the injection plunger, the axial end portion of the injection plunger has a second helical groove formed between a plurality of first helical grooves, and a thermocouple is provided in the second helical groove.

In the above-indicated fourth preferred form, the thermocouple is advantageously provided on the injection plunger around which the micro sheath heater is wound, while the thermocouple is prevented from projecting from the outer circumferential surface of the plunger. Thus, the thermocouple can directly measure the temperature of the plunger and, based on the measured temperature, the temperature of the plunger can be controlled through the micro sheath heater. Therefore, the temperature control can be carried out with higher accuracy. In addition, in the fourth preferred form, the temperature can easily be measured at any desired point on the outer circumferential surface of the plunger around which the micro sheath heater is wound.

The present apparatus may comprise at least one thermocouple. However, in a fifth preferred form, the axial end portion of the injection plunger has a plurality of the second helical grooves, and a plurality of thermocouples being provided in the plurality of second helical grooves, respectively.

In the injection apparatus having the above-indicated structure, one or more of the plurality of thermocouples may be reserved as a spare thermocouple or couples. In this case, even if one or more thermocouples may break, the application of electric power is just switched from the dead thermocouple or couples to the spare thermocouple or couples, to continue injection molding operations, without needing any exclusive repairing operation such as replacing of the dead thermocouples with the spare thermocouples. The distribution of temperature of the plunger in the axial direction thereof can be detected by measuring respective temperatures at different points on the plunger, and the average of those temperatures can be obtained.

The heating device in accordance with the fifth feature of the invention or the temperature measuring device in accordance with the fourth preferred form of the fifth feature is also applicable to the prior screw-in-plunger injection apparatus disclosed in Japanese Patent Application laid open for opposition purposes under Publication No. 46-2909 or Japanese Utility Model Application laid open for inspection purposes under Publication No. 60-171319. If the prior screw-in-plunger injection apparatus employs the heating device, the injection plunger located in the injection cylinder can directly be heated by the heating device, so that the control of temperature of the resin material fed through the plunger, such as the heating of the material, may be carried out with accuracy and with stability as indicated above. In addition, if the temperature measuring device is simultaneously employed, the temperature can easily be measured at any desired points on the outer circumferential surface of the plunger as indicated above.

According to a sixth feature of the invention, the injection apparatus further comprises a cooling device which cools an axial end portion of the injection plunger which is located in the inner hole of the injection cylinder.

In the screw-in-plunger injection apparatus in accordance with the first aspect of the invention, the passage through which the resin material is fed to the plunger-injection storage space is provided in the inner hole of the injection plunger, and the plunger is located in the injection cylinder. Therefore, the passage is surrounded by the two walls provided by the plunger and the cylinder, so that heat may easily be trapped in the passage. As the injection apparatus successively performs molding operations, the temperature of the passage gradually increases because of the heat internally generated by the rotation of the screw, and accordingly the temperature of the resin material may excessively increase. Consequently bad moldings or defective products due to scorching or silvering may occur. In particular, in the case where PVC (polyvinyl chloride) is used for successive molding operations, it is difficult to control the temperature because the resin material easily decomposes due to excessively high temperatures.

However, in the screw-in-plunger injection apparatus having the structure in accordance with the sixth feature of the invention, the cooling device can cool the axial end portion of the plunger which is covered by the injection cylinder to provide the double walls around the passage through which the resin material is fed to the plunger-injection storage space. Thus, the increasing of the temperature of the passage is reduced or prevented, and accordingly the problems such as the decomposition of the material due to the excessively high temperatures are effectively avoided. Therefore, the present apparatus can successively and stably produce good injection molding products.

The cooling device in accordance with the sixth feature of the invention is also applicable to the prior screw-in-plunger injection apparatus disclosed in Japanese Patent Application laid open for opposition purposes under Publication No. 46-2909 or Japanese Utility Model Application laid open for inspection purposes under Publication No. 60-171319. If the cooling device is employed in the prior injection apparatus, the increasing of temperature of the passage through which the resin material is fed and which is covered by the double walls, is effectively reduced or prevented, so that the injection apparatus enjoys improved molding performance.

Moreover, in the screw-in-plunger injection apparatus having the structure in accordance with the sixth feature of the invention, the cooling device which cools the injection plunger has no limitation. However, in a first preferred form in accordance with the sixth feature, the cooling device comprises a helical coolant passage which is formed in the axial end portion of the injection plunger so as to extend in the axial direction, and a coolant which flows through the coolant passage. The helical coolant passage may be provided by a third helical passage which helically entends in the outer circumferential surface of the injection plunger, and a sleeve which is externally fit on the axial end portion of the plunger to cover the third helical groove. More preferably, the helical coolant passage may have a helical go-and-return passage provided by two third helical grooves which extend substantially parallel to each other from the other axial end of the plunger toward the one axial end thereof and which are connected to each other at the respective one axial ends thereof. In the last case, the coolant is supplied through the other axial end of one of the two third grooves and is collected through the other axial end of the other third groove.

The fifth preferred form in accordance with the sixth feature is preferably combined with the fifth feature. In this case, the coolant passage is advantageously provided on the injection plunger without interfering the micro sheath heater or the thermocouple being also provided on the plunger.

According to a seventh feature of the invention, the injection apparatus further comprises a first heating device which heats an axial end portion of the injection plunger which is located in the inner hole of the injection cylinder, a second heating device which heats a tubular portion of the injection cylinder which defines the inner hole thereof into which an axial end portion of the injection plunger which is located, and a control device which controls the first heating device and the second heating device such that the tubular portion of the injection cylinder has a temperature lower than the axial end portion of the injection plunger.

The screw-in-plunger injection apparatus in accordance with the present invention suffers from the problem that, when the resin material is injected in the plunger-type injection operation or in the inline-screw-type injection operation, the pressure of resin material stored in the plunger-injection storage space or the reduced storage space increases, so that the resin material may flow backward through a narrow space between the injection plunger and the screw or between the injection plunger and the injection cylinder. Conventionally, this problem has been solved, for example, by providing a screw with a check valve or a ring valve and thereby preventing resin material from flowing back through a space between an injection plunger and the screw. However, there have been no effective measures for preventing resin material from flowing back through a space between the plunger and an injection cylinder.

In the injection apparatus having the structure in accordance with the seventh feature, the tubular portion of the injection cylinder in which the axial end portion of the injection plunger is located, can be controlled to have a temperature lower than that of the axial end portion of the plunger. Thus, the temperature of the space present outside the plunger can be sufficiently lowered while the resin material fed through the plunger can be sufficiently heated. Therefore, the temperature of resin material flowing back through the space present outside the plunger (i.e., space between the plunger and the cylinder) lowers, and the viscosity of the resin material increases. Accordingly, the flowing back of resin material can be effectively reduced or prevented, the maintenance of the injection apparatus can be done with ease, and successive molding operations can be carried out with stability.

The structure in accordance with the seventh feature is preferably combined with the structures in accordance with the fifth and sixth features. In this case, the resin material is effectively prevented from flowing back into the position where the micro sheath heater or the thermocouple or provided, or the coolant passage, and thereby damaging their functions. Thus, the injection apparatus enjoys improved reliability and life expectancy.

The temperature control system provided by the first and second heating devices and the control device in accordance with the seventh feature is also applicable to the prior screw-in-plunger injection apparatus disclosed in Japanese Patent Application laid open for opposition purposes under Publication No. 46-2909 or Japanese Utility Model Application laid open for inspection purposes under Publication No. 60-171319. If the temperature control system is employed in the prior injection apparatus, then the flowing back of the resin material can be effectively reduced or prevented, so that the maintenance of the injection apparatus may be done with ease and successive molding operations may be carried out with stability.

According to an eighth feature of the invention, the injection apparatus further comprises a support base member, and the injection plunger and the screw are retractable, in the axial direction, to a retracted position thereof where the injection plunger and the screw are completely separate from the injection cylinder, the support base member supporting the injection cylinder such that the injection cylinder is rotatable about an axis line positioned on a side of an opening of the inner hole thereof through which an axial end portion of the injection plunger is inserted, so as to open and close the opening of the injection cylinder relative to the support base member. The support base member may comprise a hinge for supporting the injection cylinder such that the cylinder is rotatable about the axis line.

In the injection apparatus having the structure in accordance with the eighth feature, the inner hole of the injection cylinder and the end portion of the screw can easily be cleaned by opening the cylinder after the screw is extracted from the cylinder. Thus, a cleaning operation which may be carried out for changing resin materials or dealing with scorched resin material, can be done with much improved efficiency. The inventors actually measured on an injection apparatus including an injection plunger having the diameter of 269 mm and using a resin material having the pressure of 750 $kgf/cm^2$. In the case of a prior structure in which an injection cylinder is attached to a support base member with forty M36 bolts, about six hours were needed to detach the cylinder from the base member before the cleaning operation. On the other hand, in the case where a hinge is used to open and close the cylinder, only about thirty minutes were needed for opening the cylinder.

In a first preferred form in accordance with the eighth feature, the injection apparatus further comprises a disengageable engaging device which engages the injection cylinder to inhibit the opening of the injection cylinder from being opened relative to the support base member, and a rattling preventing device which prevents rattling from occurring between the injection cylinder and the support base member, by applying, to the injection cylinder, a force to keep the injection cylinder away from the support base member in a state in which the engaging device inhibits the opening of the injection cylinder from being opened relative to the support base member.

The engaging device may be provided by a pin which can be inserted in respective insertion holes of the injection cylinder and the support base member that are opposite to the hinge with respect to the opening of the cylinder, so as to connect the cylinder and the base member to each other. The rattling preventing device may be provided by a threaded tension bolt which is provided between the injection cylinder and the support base member and which is threadedly engageable to apply a force to keep the two members away from each other.

In the first preferred form in which the engaging device and the rattling preventing device are employed, the area of abutment of the injection cylinder with the support base member can be reduced and accordingly the conduction of heat from the cylinder to the base member can be reduced. Thus, the cylinder can be heated with efficiency, and the thermal expansion of the cylinder can be advantageously dealt with.

In a second preferred form in accordance with the eighth feature, the injection apparatus further comprises a jack device which is provided between the support base member and the injection cylinder and which vertically upwardly transmits a supporting force of the support base member to the injection cylinder.

In the second preferred form in which the jack device is employed, the change of the position of the injection cylinder due to its weight relative to the support base member can be easily corrected by the jack device, so that the cylinder may be positioned to be coaxial with the injection plunger.

In a third preferred form in accordance with the eighth feature, the injection apparatus further comprises a plurality of guide rollers which are provided around an opening of the inner hole of the injection cylinder, and the surface of the one axial end of the injection plunger comprises a tapered surface, the tapered surface of the injection plunger being guided by the guide rollers when the axial end portion of the injection plunger is inserted in the inner hole of the injection cylinder. Each guide roller is preferably provided by a bearing having a cam-follower structure, and three or more guide rollers are preferably provided around the opening of the injection cylinder.

In a fourth preferred form in accordance with the eighth feature, the injection apparatus further comprises a slide bush which is provided in an inner circumferential surface of an axial end of the injection cylinder which defines the opening of the inner hole of the injection cylinder, wherein the surface of the one axial end of the injection plunger comprises a tapered surface, the tapered surface of the injection plunger being guided by the slide bush when the axial end portion of the injection plunger is inserted in the inner hole of the injection cylinder. The slide bush may be provided by a tubular member which is formed of, e.g., brass and which has a tapered insertion opening whose diameter gradually increases toward its opening end.

If one or both of the third preferred form in which the guide rollers are used and the fourth preferred form in which the slide bush is used is/are employed, the injection plunger is smoothly inserted in the injection cylinder in such a manner that the plunger is positioned to be coaxial with the cylinder. Thus, the plunger is prevented from being damaged due to collision with the cylinder. In addition, the plunger is smoothly inserted in the cylinder even if the cylinder may be out of position due to its weight.

The above-indicated conventional problem has been solved according to a second aspect of the present invention, which provides a process of producing an injection molding product by injecting, using a screw-in-plunger injection apparatus in accordance with the first aspect of the invention, a resin material into a molding cavity of a metal mold, the process being characterized by advancing, when the molding cavity has a volume greater than a predetermined threshold value, the injection plunger and the screw in the axial direction in the inner hole of the injection cylinder, so as to inject the resin material from the plunger-injection storage space and advancing, when the molding cavity has a volume not greater than the threshold value, the screw in the axial direction relative to the injection cylinder and the injection plunger held in abutment with the injection cylinder, so as to inject the resin material from the reduced storage space.

In the above-indicated invention process, when a molding product is changed to a different sort of molding product and accordingly a molding-cavity volume is changed to a different one, the amount of stroke of the injection plunger or the screw needed for molding a product can easily be selected within an advantageous range. Thus, every size of product, either a small size or a large size, can be successively and stably produced with accurate control of injection amount, etc., and with excellent product quality.

In the above-indicated invention process, when the molding cavity has a volume greater than a predetermined threshold value, it is possible that the injection plunger and the screw be advanced as a unit by the same amount in the injection cylinder to inject the resin material from the plunger-injection storage space. According to a first feature of the second aspect of the invention, when the molding cavity has the volume greater than the threshold value, the screw is advanced in the inner hole of the injection cylinder, by an amount greater than an amount of advancement of the injection plunger in the inner hole of the injection cylinder, so that the screw is advanced over the injection plunger and the resin material is injected from the plunger-injection storage space.

In the case where, according to the first feature, the screw is advanced over the injection plunger for performing an injection molding by injecting the resin material from the plunger-type storage space, the amount of resin material injected from the storage space is greater by the amount of advancement of the screw relative to the plunger than in the case where the plunger and the screw are advanced as a unit. In addition, the resolution of the injection amount is improved by controlling the amount of advancement of the screw relative to the plunger.

According to a third aspect of the present invention, there is provided a process of producing an injection molding product by injecting, using a screw-in-plunger injection apparatus in accordance with the first aspect of the invention, a resin material into a molding cavity of a metal mold, the process being characterized by controlling a first temperature of an axial end portion of the injection plunger which is located in the inner hole of the injection cylinder, and a second temperature of a tubular portion of the injection cylinder which defines the inner hole thereof in which the axial end portion of the injection plunger is located, such that the second temperature is lower than the first temperature at least when the resin material is injected into the molding cavity.

In the invention process in accordance with the third aspect of the invention, the temperature of the resin material flowing back through the space present outside the injection plunger (i.e., space between the plunger and the injection cylinder) is sufficiently lowered while the resin material fed through the space present inside the injection plunger is sufficiently heated. Thus, the viscosity of the resin material increases. Accordingly, the flowing back of the resin material through the outside space can be effectively reduced or prevented, without needing a check valve or the like, and the maintenance of the injection apparatus can be done with ease. Therefore, successive molding operations can be carried out with stability.

The above-indicated injection plunger and the temperature control of the plunger are also applicable to an injection molding using a screw-in-plunger injection apparatus other than the injection apparatus in accordance with the first aspect of the invention, for example, the prior screw-in-plunger injection apparatus disclosed in Japanese Patent Application laid open for opposition purposes under Publication No. 46-2909 or Japanese Utility Model Application laid open for inspection purposes under Publication No. 60-171319. If the injection plunger and the temperature control thereof are employed, then the flowing back of the resin material can be effectively reduced or prevented, so that the maintenance of the injection apparatus may be done with ease and successive molding operations may be carried out with stability.

As is apparent from the foregoing description, the screw-in-plunger injection apparatus in accordance with the first aspect of the invention is capable of selectively carrying out the plunger-type injection molding operation and the inline-screw-type injection molding operation. In addition, since the outer diameter of the screw can be designed to be much smaller than that of the injection plunger, a large-size molding product needing a large injection amount can be produced with high quality by the plunger-type injection operation and at the same time a small-size molding product needing a small injection amount can be produced with accurate and stable control of the stroke amount of the screw by the inline-screw-type injection operation.

In the process in accordance with the second aspect of the invention, the plunger-type injection molding operation and the inline-screw-type injection molding operation are selectively carried out depending upon the injection amount needed for molding a product. Thus, every size of product, either a large-size product needing a large injection amount or a small-size product needing a small injection amount, can be successively and stably molded with accurate control of injection amount, etc.

In the process in accordance with the third aspect of the invention, the resin material is prevented from flowing back and leaking through the space between the injection plunger and the injection cylinder, irrespective of whichever operation is carried out on the screw-in-plunger injection apparatus, the plunger-type injection operation or the inline-screw-type injection operation. Thus, the injection apparatus can be maintained more easily and can successively carry out the molding operations with higher stability.

DETAILED DESCRIPTION OF THE PREFERRED EMBODIMENTS

There will be described in detail embodiments of the present invention by reference to the drawings.

Figure 1:
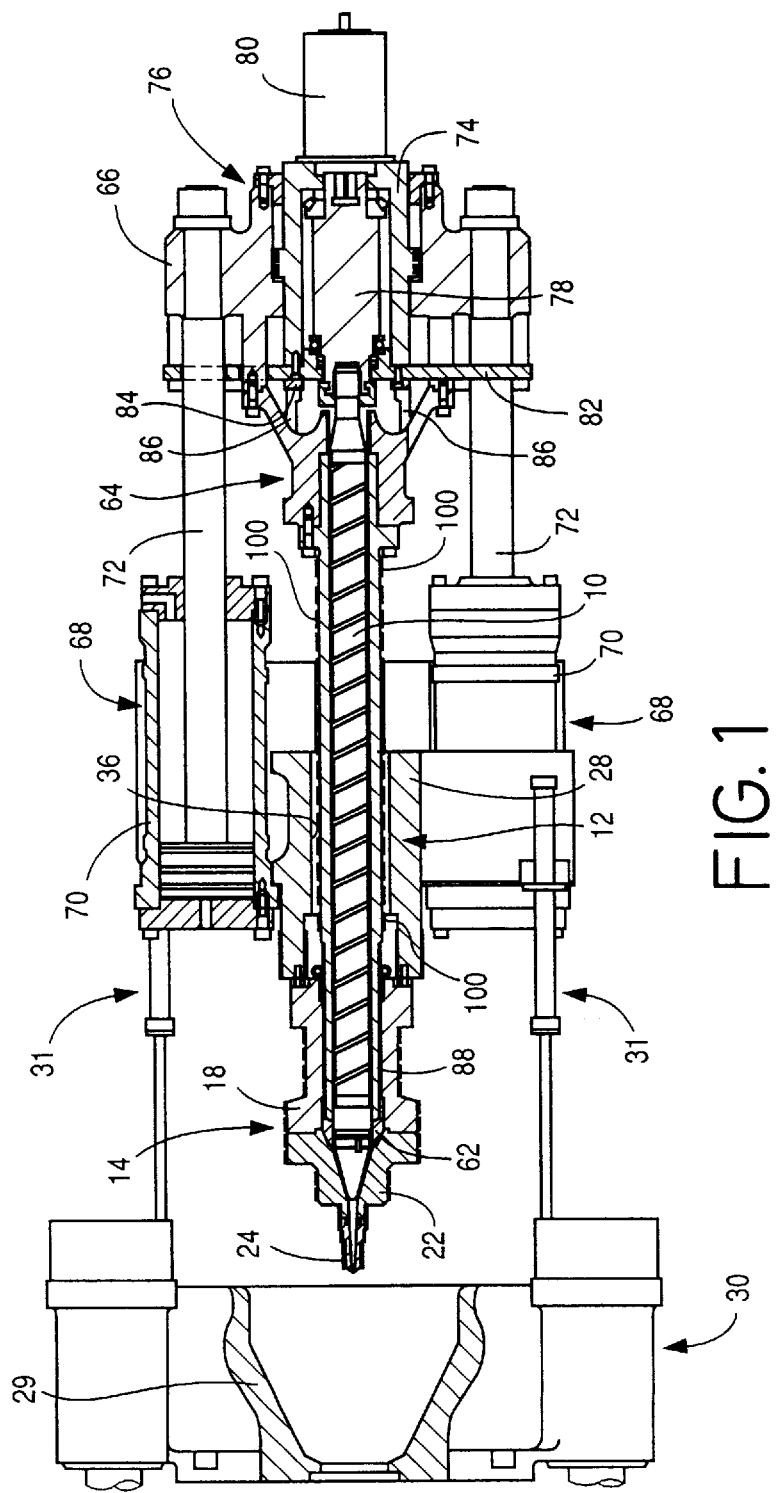
FIG. 1 is a diagrammatic, longitudinal cross section of a screw-in-plunger injection apparatus embodying the present invention, taken along a horizontal plane.
Figure 2:
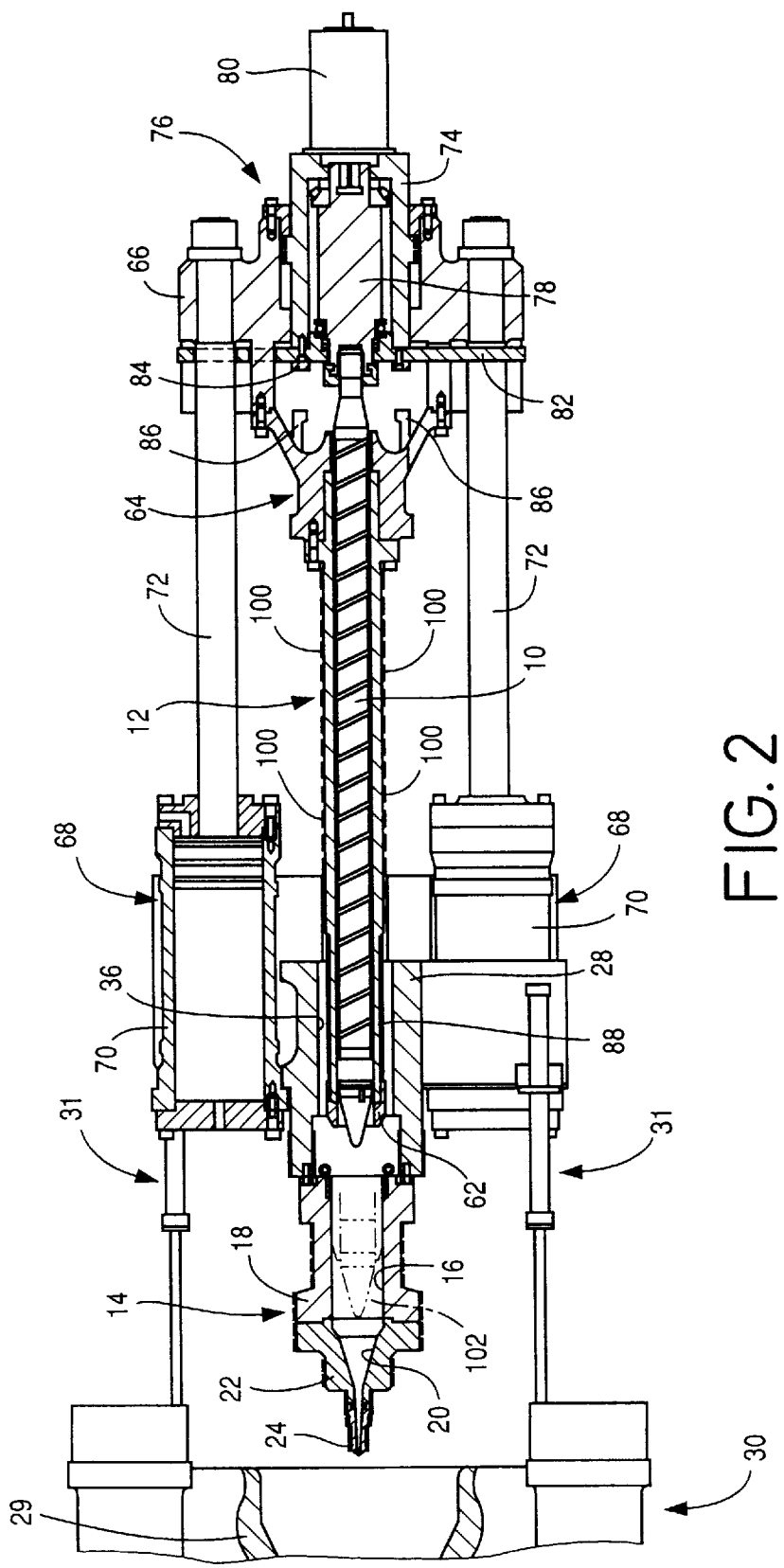
FIG. 2 is a diagrammatic, longitudinal cross section of the injection apparatus of FIG. 1 taken along a horizontal plane, the apparatus being in an operating state thereof different from an operating state thereof shown in FIG. 1.
Figure 3:
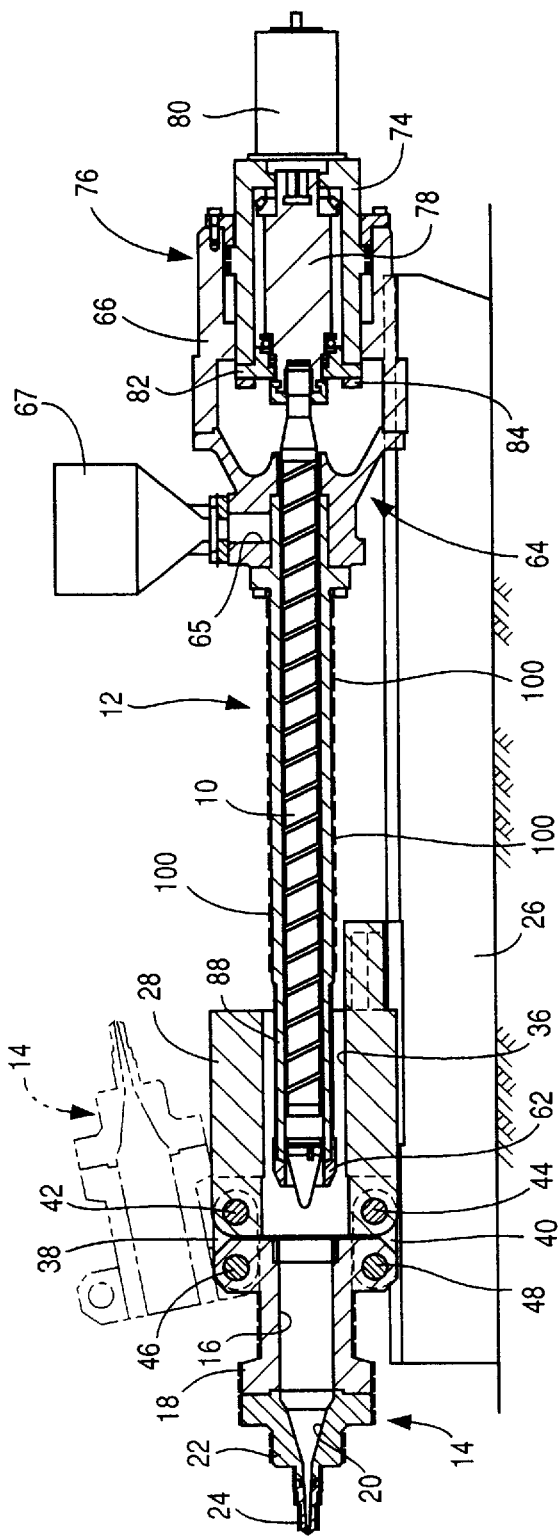
FIG. 3 is a longitudinal cross section of the injection apparatus of FIG. 2 taken along a vertical plane.

First, in FIGS. 1 to 3, there is shown a screw-in-plunger injection apparatus as a first embodiment of the present invention. The injection apparatus includes a tubular injection plunger 12 having an inner hole in which a screw 10 extends. The plunger 12 is movable relative to a hollow injection cylinder 14 such that a left-hand end portion of the plunger 12 can be inserted in an inner hole of the cylinder 14. FIG. 1 is a longitudinal cross section of the injection apparatus, taken along a horizontal plane, the apparatus being in a state in which the screw 10 and the plunger 12 are located at an advanced position thereof to which the plunger 12 can be advanced in an insertion direction in which the end portion of the plunger 12 is inserted in the cylinder 14. FIGS. 2 and 3 are a longitudinal cross section of the injection apparatus, taken along a horizontal plane, and a longitudinal cross section of the same, taken along a vertical plane, respectively, the apparatus being in a different state thereof in which the screw 10 and the plunger 12 are located at a retracted position thereof to which the plunger 12 can be retracted in an extraction direction in which the end portion of the plunger 12 is extracted from the cylinder 14.

More specifically described, the hollow injection cylinder 14 includes a tubular portion 18 having a cylindrical inner hole 16, and a head portion 22 which has a tapered inner hole 20 and which is attached to an axial end of the tubular portion 18. The cylinder 14 additionally includes a nozzle 24 fixed to a left-hand end portion of the head portion 22. A plurality of band heaters 25 are provided on each of respective outer circumferential surfaces of the tubular portion 18, the head portion 22, and the nozzle 24, for the purpose of temperature control. The cylinder 14 is attached to a support base member 28 which is supported by a guide base member 26 shown in FIG. 3. Thus, the cylinder 14 is movable in an axial direction thereof, together with the support base member 28, on the guide base member 26.

In the present embodiment, as shown in FIGS. 1 to 3, the guide base member 26 is positioned such that a left-hand axial end of the injection cylinder 14 faces a fixed plate 29 of a mold holding device 30. A plurality of first hydraulic cylinder devices 31 are provided between the guide base member 26 and the molding holding device 30. The first cylinder devices 31 operate for moving the support base member 28 and the injection cylinder 14 toward, and away from, the mold holding device 30, on the guide base member 26. When the cylinder 14 is moved toward the mold holding device 30, the nozzle 24 is brought into contact with a mold (not shown) held by the holding device 30.

Figure 4:
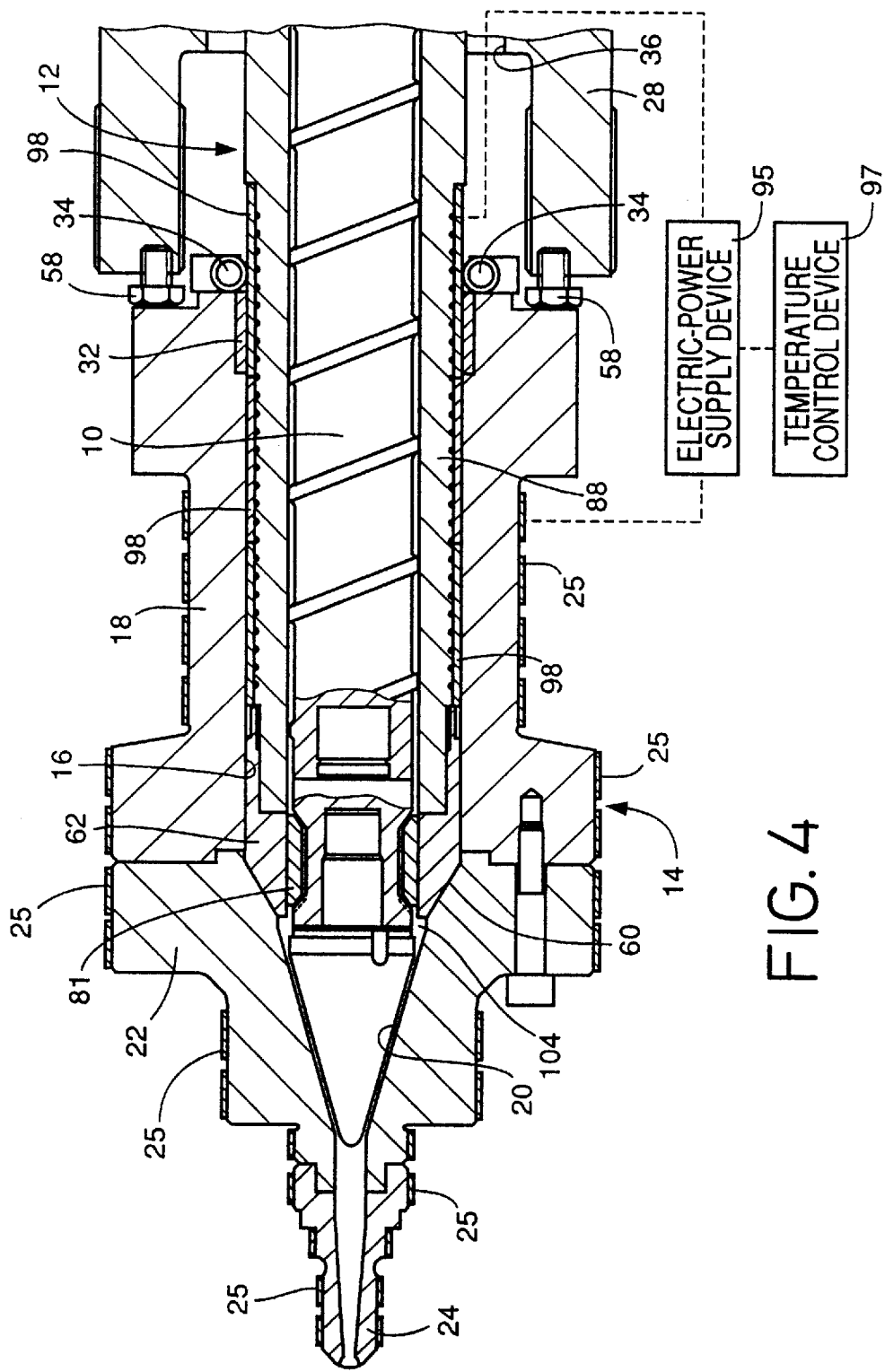
FIG. 4 is an enlarged view for explaining a portion of the injection apparatus of FIG. 1.

As shown in FIG. 4 that is an enlarged view of a portion of the injection apparatus shown in FIG. 1, a slide bush 32 is provided at a right-hand open end of the inner hole 16 of the tubular portion 18. The slide bush 32 is formed of a metal such as brass, and has a smooth inner circumferential surface with a diameter substantially the same as the diameter of the inner hole 16. Although not shown in the figure, the inner circumferential surface of the bush 32 is slightly tapered such that the diameter thereof increases in a direction toward the right-hand open end of the inner hole 16. A plurality of (e.g., three) cam followers 34 are provided around the opening of the inner hole 16 such that each cam follower 34 includes a stud fixed via a bolt to the tubular portion 18, an outer cylindrical ring as a guide roller, and an axis member bearing the ring such that the ring is rotatable about the axis member.

When the injection plunger 12 is inserted in the injection cylinder 14, the left-hand end portion of the plunger 12 is guided first by the cam followers 34 and subsequently by the tapered inner hole of the slide bush 32. Thus, a possible error of positioning of the plunger 12 relative to the cylinder 14 in a radial direction thereof is corrected, and the plunger 12 is smoothly introduced into the inner hole 16 of the cylinder 14.

The support base member 28 has an inner hole 36 having a diameter greater than that of the inner hole 16 of the tubular portion 18. The injection plunger 12 is inserted in the injection cylinder 14 through the inner hole 36 of the support base member 28. An upper and a lower link 38, 40 project in the axial direction from an upper and a lower side of a left-hand end of the inner hole 36 of the support base member 28, respectively, and are fixed to the support base member 28 with fixing pins 42, 44, respectively. A right-hand end portion of the tubular portion 18 is connected to respective left-hand end portions of the upper and lower links 38, 40 with an axis pin 46 and a stopper pin 48, respectively.

Figure 5:
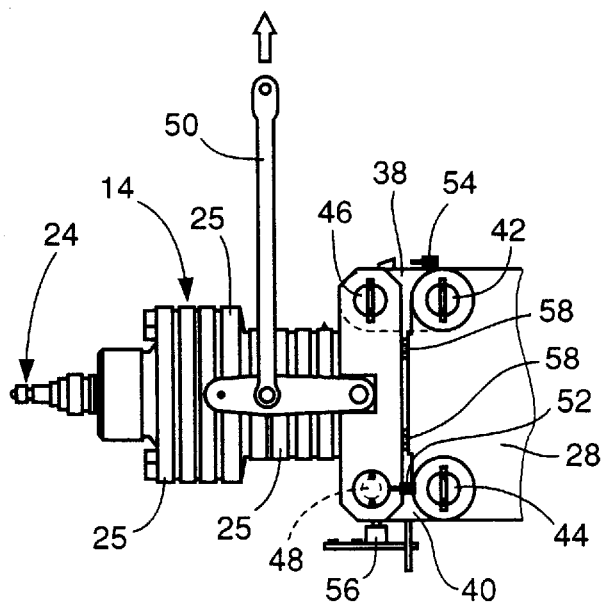
FIG. 5 is an elevation view of an injection cylinder of the injection apparatus of FIG. 1 which can be opened and closed, the cylinder being in a closed state thereof.
Figure 6:
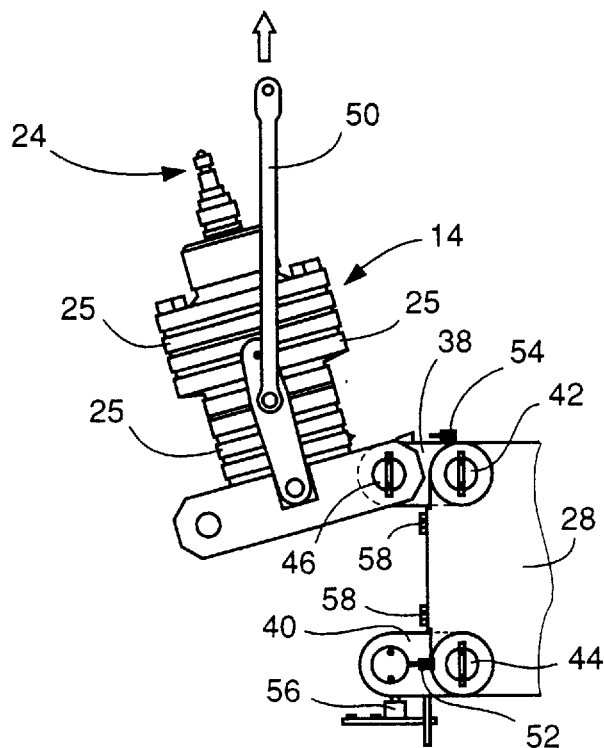
FIG. 6 is an elevation view of the injection cylinder being in a state thereof different from the closed state thereof shown in FIG. 5.
Figure 7:
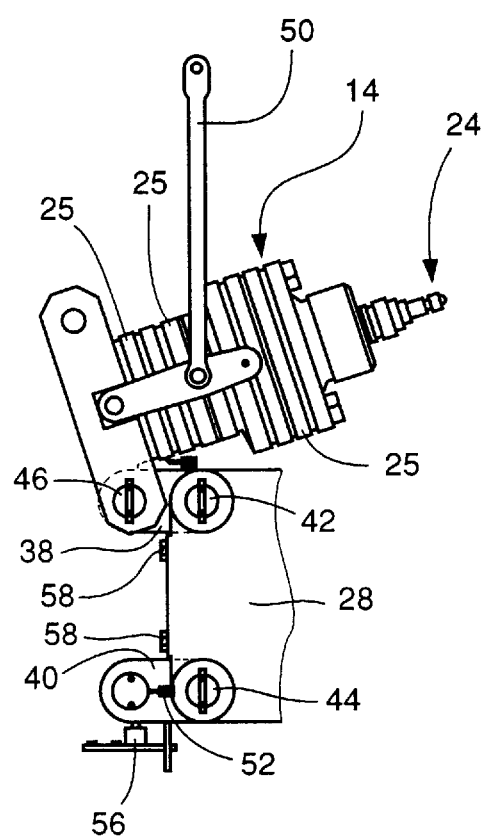
FIG. 7 is an elevation view of the injection cylinder being in an opened state thereof.

As shown in FIGS. 5 to 7, if the stopper pin 48 is removed with the injection plunger 12 and the screw 10 being extracted from the injection cylinder 14, then the cylinder 14 can be rotated about the axis pin 46. When the cylinder 14 is rotated upward about the pin 46 and is supported on the support base member 28, the inner hole 16 of the tubular portion 18 is exposed. In this situation, if the plunger 12 and the screw 10 are advanced to project out of the support base member 28, then the plunger 12 and the screw 10 are also exposed. The rotation of the cylinder 14 about the pin 46 is preferably done by, e.g., lifting up a rod 50 using a crane, etc., as shown in FIG. 7. In the present embodiment, limit switches 52, 54 which detect the opened and closed states of the cylinder 14 are provided on the support base member 28, for safety management purposes.

A hydraulic jack 56 as a jack device is provided below a right-hand end portion of the tubular portion 18, and is fixed to the support base member 28. The hydraulic jack 56 applies a supporting force to the injection cylinder 14 for lifting vertically upward relative to the support base member 28. Owing to the supporting force, the cylinder 14 can be held in position. In addition, the load applied to the stopper pin 48 can be reduced so that the pin 48 may easily be attached to, or detached from, the lower link 40.

Not less than four adjusting bolts 58 are threadedly engaged with an axial end portion of the support base member 28 which faces the tubular portion 18, such that the bolts 58 surround the inner hole 36 of the base member 28. Respective heads of the bolts 58 are abutable on an axial end face of the tubular portion 18. The respective amounts of threaded engagement of the bolts 58 are adjustable so that the bolts 58 project from the support base member 28 and apply a force to make the tubular portion 18 away from the support base member 28 in the axial direction. Thus, rattling is prevented from occurring between the support base member 28 and the injection cylinder 14 which are connected to each other via a supporting device including the links 38, 40. That is, the cylinder 14 can be connected to the base member 28 with stability, while simultaneously the amount of inclination of the cylinder 14 can be adjusted with accuracy.

In the present embodiment, the stopper pin 48 provides an engaging device which engages the injection cylinder 14 and stops the rotation of the cylinder 14 about the axis pin 46, i.e., inhibits the cylinder 14 from being opened, and the adjusting bolts 58 provided between the support base member 28 and the tubular portion 18 provide a rattling preventing device. Owing to the provision of the rattling preventing device, the supporting device including the links 38, 40 enjoys the advantage that clearances provided between parts of the supporting device accommodate thermal expanses of those parts.

The injection plunger 12 has an elongate, generally cylindrical shape. An abutable cylindrical head 62 is fixed by threaded engagement to a left-hand axial end of the plunger 12. The head 62 has a tapered outer circumferential surface 60. A movable block 66 as a movable base member is fixed via a leg member 64 to a right-hand end of the plunger 12. The leg member 64 has a resin-material inlet 65 which extends therethrough and opens upward. A hopper 67 is fixed to the leg member 64. A resin material is fed to the plunger 12 via the hopper 67 and the material inlet 65.

The movable block 66 is provided on, and supported by, the guide base member 26 such that the block 66 is movable toward and away from the support base member 28. A plurality of second hydraulic cylinder devices 68 which are provided between the support base member 28 and the movable block 66, drive or move the movable block 66 toward and away from the support base member 28. When the block 66 is moved toward and away from the support base member 28, the injection plunger 12 is advanced and retracted in the inner hole 16 of the injection cylinder 14. In particular, when the plunger 12 is located at the advanced position thereof, the tapered outer surface 60 of the left-hand end portion of the plunger 12 is held in tight abutment with the tapered portion of the inner hole 20 of the cylinder 14, as shown in FIG. 1. On the other hand, when the plunger 12 is located at the retracted position thereof, the plunger 12 is completely extracted from the inner hole 16 of the cylinder 14, as shown in FIG. 2 or 3. Each second hydraulic cylinder device 68 includes a cylinder member 70 provided on the support base member 28, and a piston rod 72 including a projecting end fixed to the movable block 66.

Figure 8:
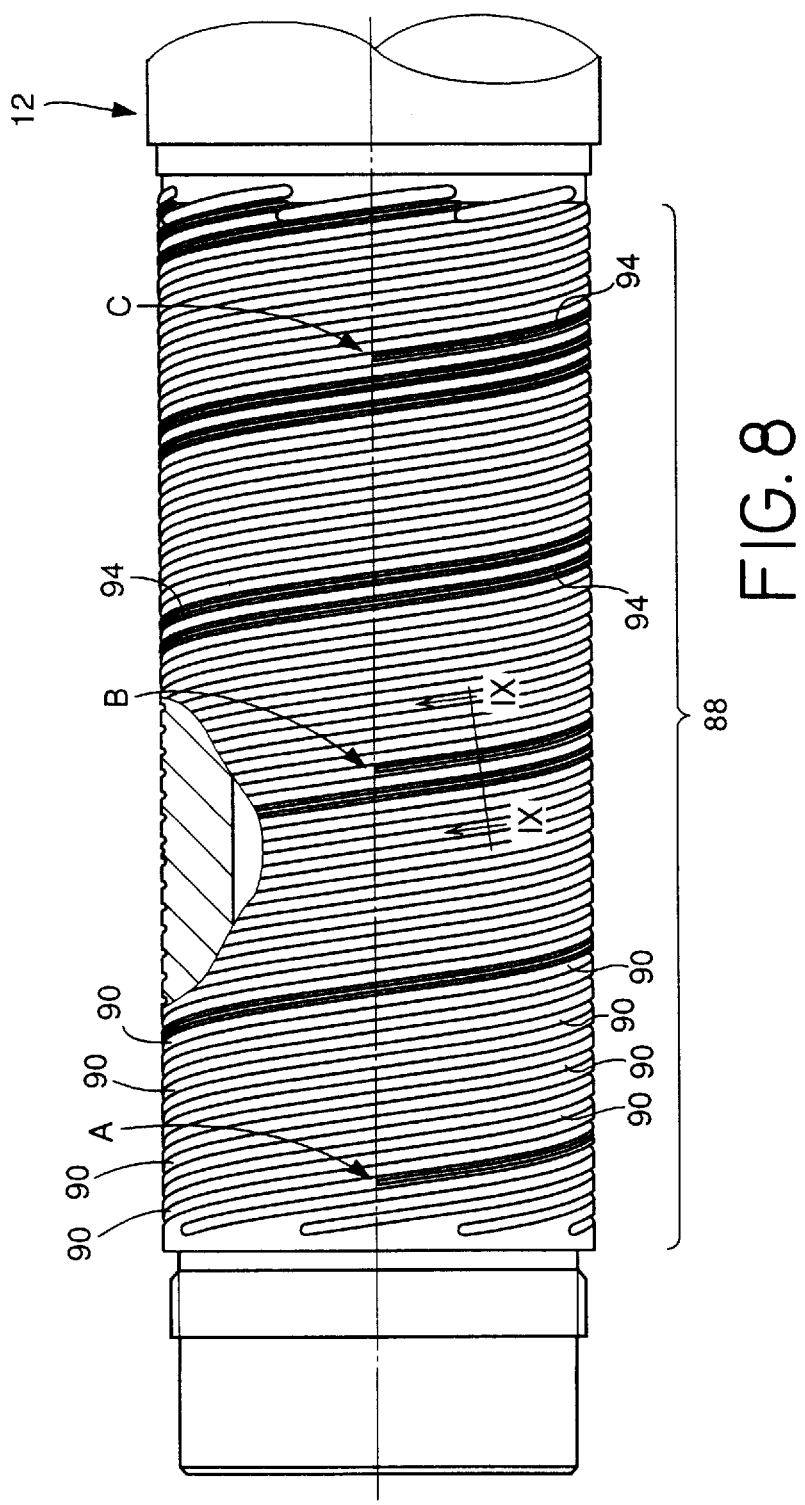
FIG. 8 is an enlarged, partly cut away, elevation view of an end portion of an injection plunger of the injection apparatus of FIG. 1.
Figure 9:
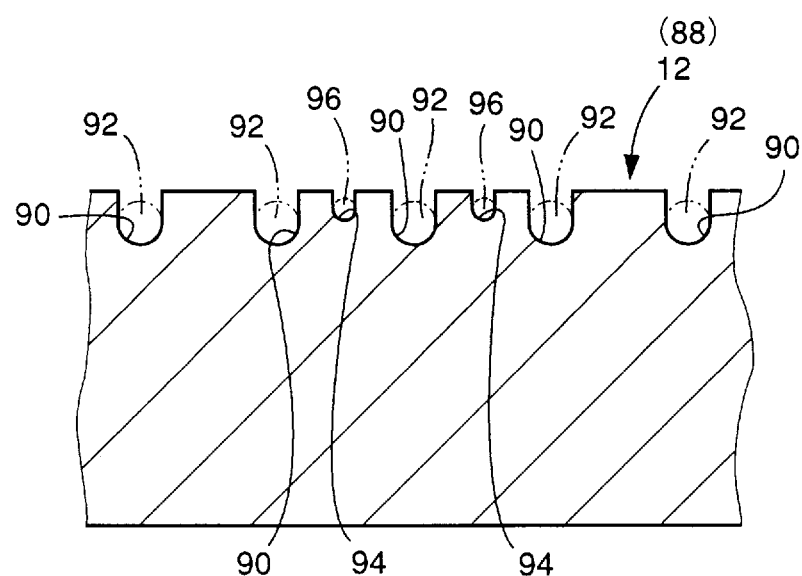
FIG. 9 is an enlarged view of the injection plunger taken along line IX—IX in FIG. 8.

The injection plunger 12 includes a left-hand axial end portion 88 which is located in the injection cylinder 14 when the plunger 12 is advanced. As shown in FIGS. 8 and 9, eight first helical grooves 90 are formed parallel to one another in an outer circumferential surface of the axial end portion 88 over an entire axial-direction length thereof. Each first helical groove 90 has a semicircular cross section. A small-diameter micro sheath heater 92 is embedded in each first helical groove 90, as indicated in FIG. 9. In the present embodiment, in a normal state, an electric current is applied to only six heaters 92 out of the eight heaters 92. When one or more of the six heaters 92 break, the electric current is switched and applied to one or both of the remaining two heaters 92.

Three second helical grooves 94 are formed parallel to one another in the outer surface of the axial end portion 88 of the injection plunger 12, such that each second helical groove 94 extends between two first helical grooves 90, 90 which are adjacent to each other. The second helical grooves 94 have a semicircular cross section slightly smaller than that of the first helical grooves 90. A small-diameter thermocouple 96 is embedded in each second helical groove 94. In the present embodiment, as shown in FIG. 8, the three second helical grooves 96 have different lengths as measured from a right-hand end of the end portion 88 of the plunger 12, so that the three thermocouples 96 can measure respective temperatures at different positions, A, B, C, in the axial direction on the end portion 88.

Thus, the end portion 88 of the injection plunger 12 is heated by applying an electric current to the micro sheath heaters 92, and the thermocouples 96 are used to measure the temperature of the end portion 88. Therefore, the temperature of the end portion 88 is adjusted by controlling the application of electric current to the heaters 92 based on the temperatures measured by the thermocouples 96.

In the present embodiment, an electric-power supply device 95 supplies a heater current to each of the micro sheath heaters 92 provided on the end portion 88 of the injection plunger 12 and the band heaters 25 provided on the tubular portion 18 of the injection cylinder 14. A temperature control device 97 controls the respective magnitudes of electric currents supplied from the supply device 95 to the heaters 92, 25. It is preferred that a temperature measuring device such as a thermocouple be also provided on the tubular portion 18 of the cylinder 14 and that the control device 97 be adapted to control the supply device 95 to adjust with accuracy the respective temperatures of the plunger 12 and the cylinder 14 to different target values, respectively.

As shown in FIG. 4, a metal sleeve 98 as a protect sleeve is externally fit on the end portion 88 of the injection plunger 12 after the micro sheath heaters 92 and the thermocouples 96 are disposed. Thus, the metal sleeve 98 covers and protects the heaters 92 and the couples 96. Respective lead wires of the heaters 92 and the couples 96 are gathered at a right-hand end of the end portion 88 and are led on and along the outer surface of the plunger 12.

As shown in FIGS. 1 to 3, band heaters 100 are provided on an outer circumferential surface of a right-hand end portion of the injection plunger 12 other than the left-hand end portion 88. The right-hand end portion cannot be located in the injection cylinder. 14. The right-hand end portion can be heated, and the temperature thereof can be adjusted, by applying an electric current to the band heaters 100.

The movable block 66 supports a third hydraulic cylinder device 76 including a hollow box-like piston 74 which is movable in the axial direction of the injection plunger 12. A joint rod 78 is provided in an inner hole of the piston 74 such that the rod 78 extends in the axial direction of the piston 74, and is supported by a plurality of bearings such that the rod 78 is rotatable about a center axis line thereof. A right-hand end portion of the screw 10 projects from the plunger 12, and is coaxially fixed to one of opposite axial ends of the joint rod 78. An output shaft of an oil-operated motor 80 is coaxially fixed to the other axial end of the rod 78.

The oil-operated motor 80 drives or rotates the screw 10 about the center axis line thereof in the injection plunger 12. The third hydraulic cylinder device 76 moves the screw 10 in the axial direction thereof in the plunger 12. In the present embodiment, a ring valve 81 is provided on the screw 10, for preventing the melt resin material from flowing back.

An engagement plate 82 is fixed to a left-hand end portion of the piston 74 such that the plate 82 extends outward in a plane perpendicular to the axial direction of the screw 10. The piston rods 72 of the second hydraulic cylinder devices 68 extend through the engagement plate 82. When the piston 74 is moved, the plate 82 is moved along the piston rods 72, and the piston 74 and the screw 10 are guided in the axial direction. In addition, an annular projection 84 which projects toward the screw 10 is fixed to a surface of the engagement plate 82. As shown in FIG. 1, abutable members 86 which project from the leg member 64 are abutable on the annular projection 84. The amount of advancement of the piston 74 of the third hydraulic cylinder device 76, that is, amount of advancement of the screw 10 relative to the plunger 12 is limited by the abutment of the projection 84 on the abutable members 86.

In the injection apparatus constructed as described above, when the injection plunger 12 is inserted in the injection cylinder 14 by a predetermined amount, an original storage space 102 having a predetermined volume is defined in front of the plunger 12 in the cylinder 14, as shown at phantom lines in FIG. 2. In this state, the screw 10 is rotated for feeding, to the storage space 102, the resin material which is fed from the resin-material inlet 65 to the plunger 12 while being heated and melted. After a predetermined amount of melted resin material is stored in the storage space 102, the plunger 12 and the screw 10 are driven and advanced, so that both the plunger 12 and the screw 10 function as a plunger for injecting the melted resin from the storage space 102 via the nozzle 24. Thus, a molding is carried out by the present apparatus functioning as a plunger-type injection device.

When a molding is carried out by the plunger-type injection, the screw 10 is located at the advanced position thereof relative to the plunger 12, and the screw 10 and the plunger 12 are moved together in the axial direction thereof. However, for example, in the case where a great amount of resin is injected, the screw 10 may be located at a more or less retracted position relative to the plunger 12 in the axial direction, so that the storage space 102 may have an increased volume. In the latter case, an injection is carried out by advancing the screw 10 from that retracted position relative to the plunger 12 in the axial direction.

In addition, in the injection apparatus constructed as described above, when the injection plunger 12 is inserted and located at the advanced position thereof in the injection cylinder 14, the outer tapered surface 60 of the left-hand end of the plunger 12 is held in fluid-tight abutment with the inner tapered surface of the cylinder 14, as shown in FIG. 1 or 4, so that the inner diameter of the cylinder 14 is reduced by substantially the thickness of the wall of the plunger 12. Accordingly, a reduced storage space 104 whose volume is smaller than that of the initial storage space 102 is provided in front of the screw 10. In the state in which the plunger 12 is located at the advanced position thereof, the screw 10 is rotated for feeding, toward the reduced storage space 104, the resin material which is being heated and melted. In addition, because of the pressure of the resin material fed to the reduced storage space 104, the screw 10 is moved back by a predetermined amount, so that a predetermined amount of melted resin is stored in the reduced storage space 104. Then, the screw 10 is driven or moved forward, so that the melted resin is squeezed from the reduced storage space 104 by the screw 10 and is injected through the nozzle 24. Thus, a molding is carried out by the present apparatus functioning as an inline-screw-type injection device.

As is apparent from the foregoing description, the injection apparatus constructed as described above can be used as not only a plunger-type injection device but also an inline-screw-type injection device, and can be switched to a desired one of the two functions. The effective plunger diameter (i.e., outer diameter of the plunger 12) of the plunger-type injection device can be sufficiently greater than that (i.e., outer diameter of the screw 10) of the inline-screw-type injection device, and accordingly the maximum controllable resin amount (i.e., maximum volume of the original storage space 102) of the plunger-type injection device can be sufficiently greater than that (i.e., maximum volume of the reduced storage space 104) of the inline-screw-type injection device. Thus, one of the plunger-type injection molding function and the inline-screw-type injection molding function can be selected depending upon a desired size of the molding products. Different sizes of molding products need different amounts of injection of resin material. Therefore, irrespective of whichever size of molding products is desired, i.e., irrespective of which one of the two sorts of injection molding functions is selected, the amount of stroke of the plunger 12 or the screw 10 can be controlled within an advantageous range.

For example, the respective outer diameters and/or respective maximum stroke amounts of the injection plunger 12 and the screw 10 can be so designed that the actual stroke amount of the plunger 12 or the screw 10 employed in the plunger-type injection molding function or the inline-screw-type injection molding function may be controlled within 10 to 70% of the maximum stroke amount of the same 12, 10, depending upon the size of molding products. Thus, any size of molding products can be successively injected with stability while at the same time the injection amount and/or pressure can be controlled with accuracy and the quality of products is assured with stability.

In the present embodiment, the micro sheath heaters 92 are provided on the end portion 88 of the injection plunger 12 that can be located in the injection cylinder 14. Thus, the temperature of the plunger 12 can be controlled not only indirectly via the cylinder 14 but also directly by the heaters 92. Thus, the temperature of the resin material in the plunger 12, the original storage space 102, or the reduced storage space 104 can be controlled with accuracy. That is, the high fluidity of the melted resin material fed to the storage space 102 or the reduced storage space 104 can be maintained with stability. Accordingly, resin material can be injected at a low pressure, therefore the present injection apparatus can enjoy low strength requirements and can be used with metal molds which enjoy low strength requirements. Thus, the size, weight, or production cost of the injection apparatus or the metal molds can be reduced. If the injection pressure is selected at 50 to 750 kg/cm$^2$, for example, a sufficient amount of melted resin material can be injected into the molding cavity to fill it up, and metal molds having a low strength, for example, molds formed of an aluminum alloy, can be used.

If the distance between the micro sheath heaters 92 provided on the outer circumferential surface of the injection plunger 12 and the inner circumferential surface of the same 12 is excessively small, the heating and temperature control of the resin material being fed in the plunger 12 are excessively influenced by the on/off switching of the heaters 92. On the other hand, if the distance is excessively great, the response of the temperature control excessively delays. Therefore, it is desirable to select, as the distance, an appropriate value in view of the material of the plunger 12 and/or the physical properties of the resin material. For example, the distance may be selected at 30 to 50 mm in additional consideration of the strength of the plunger 12, etc.

In the present embodiment, the electric power supplied to the micro sheath heaters 92 provided on the injection plunger 12 and the electric power supplied to the band heaters 25 provided on the injection cylinder 14 are controlled, independent of each other, by the temperature control device 97, so that the respective temperatures of the plunger 12 and the cylinder may be adjusted to different target values, respectively. Therefore, the temperature of the cylinder 14 can be lower than that of the plunger 12, while a sufficiently high temperature is obtained for heating the resin material in the plunger 12. In the latter case, the temperature of the resin material trapped between the plunger 12 and the cylinder 14 is decreased and the fluidity thereof is lowered. Thus, the resin material is effectively prevented from flowing back through the gap between the plunger 12 and the cylinder 14. Accordingly, various problems including the leakage of the resin material through the space or gap between the plunger 12 and the cylinder 14 at the time of injection of the resin material, are effectively avoided. Therefore, the present apparatus can be maintained very easily, and the malfunction of the apparatus due to the leaked resin material or the like can be avoided. That is, the present apparatus can successively perform the injection molding operations with stability.

Moreover, in the present embodiment, the injection cylinder 14 can be rotated about the axis pin 46, so that the inner hole 16 of the cylinder 14 providing the original storage space 102 or the reduced storage space 104 may be exposed. In the state in which the cylinder 14 is opened, the plunger 10 and the screw 10 can be advanced to be exposed to an external space. Thus, the inner surface of the cylinder 12 and the outer surface of the plunger 12, to which deteriorated resin material may be adhered, can be cleaned quickly, easily, and surely. Therefore, the present apparatus can even produce, with high productivity, different sorts of products (e.g., various sorts of large-size products), each sort in a small number. Moreover, a resin which easily decomposes, such as polyvinyl chloride, can be used with high efficiency, and the change of resins having different colors can be done with ease.

Figure 10:
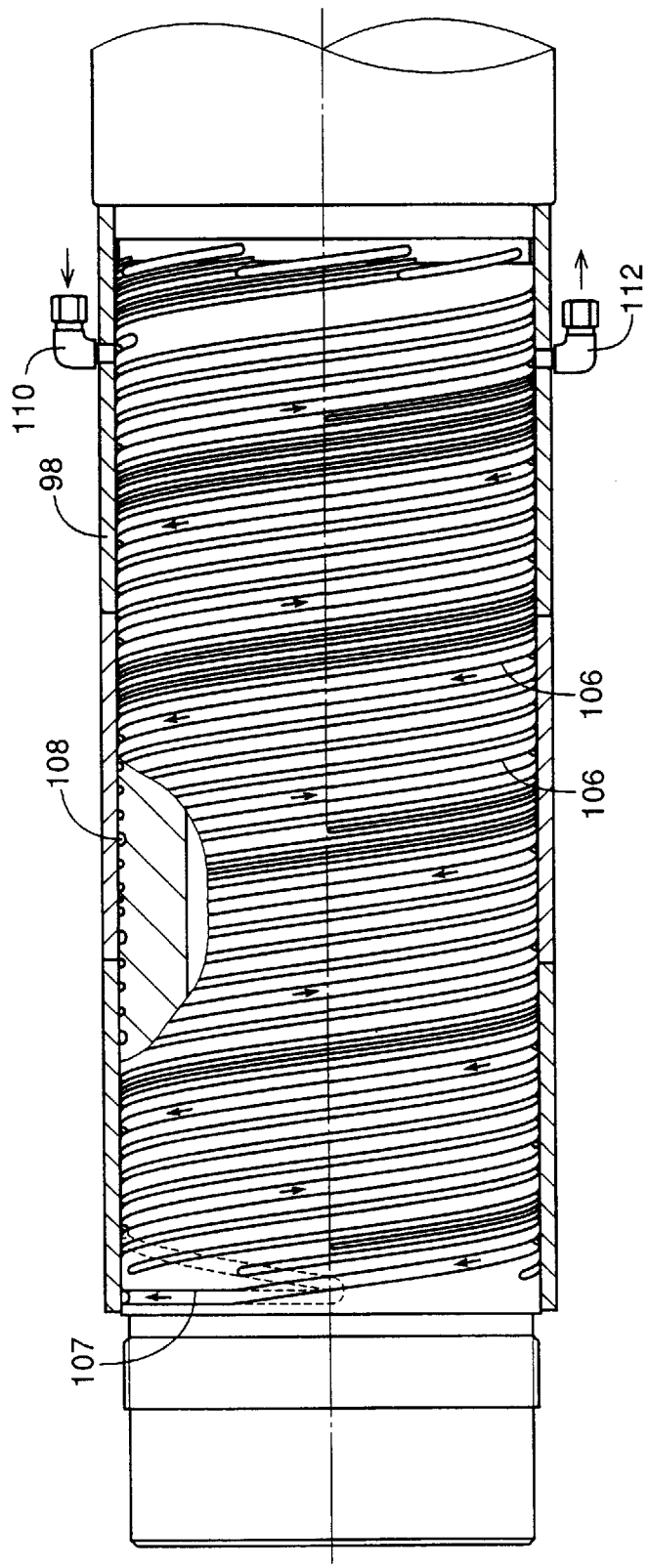
FIG. 10 is an enlarged view of a portion of a different injection plunger which may be employed in the screw-in-plunger injection apparatus shown in FIG. 1 to provide a different screw-in-plunger injection apparatus as another embodiment of the present invention.

Referring next to FIG. 10, there will be described a screw-in-plunger injection apparatus as another embodiment of the present invention, which is obtained by replacing the injection plunger 12 of the above-described first embodiment with a different injection plunger 12.

In the second embodiment, the injection plunger 12 includes an axial end portion 88 which can be located in an injection cylinder 14. Six first helical grooves 90 and three second helical grooves 94 are formed parallel to one another in an outer circumferential surface of the end portion 88. In the second embodiment, the six first helical grooves 90 are less by two than the eight first helical grooves 90 formed on the injection plunger 12 employed in the first embodiment. Those two first helical grooves 90 of the first embodiment are replaced by two third helical grooves 106, 106 in the second embodiment. The third helical grooves 106 have a semi-circular cross section slightly larger than that of the first helical grooves 90, and are formed parallel to the first and second helical grooves 90, 94. Respective left-hand ends of the two third helical grooves 106 are connected to each other via a connection groove 107, so as to provide a single continuous groove. In FIG. 10, micro sheath heaters 92 and thermocouples 96 embedded in the first and second helical grooves 90, 94 are not shown.

Respective openings of the third helical grooves 106, 106 connected to each other are covered by a metal sleeve 98 which is externally fit on the injection plunger 12. Thus, a single coolant passage 108 is provided which helically runs in the outer circumferential surface of the plunger 12 and goes and returns in the axial direction of the same and which is fluid-tightly closed by the metal sleeve 98. Two connectors 110, 112 are connected to, and communicate with, respective right-hand end portions of the two third helical grooves 106, 106 through the thickness of the metal sleeve 98. An air coolant which is supplied via an air passage (not shown) is fed to the coolant passage 108 via one 110 of the connectors 110, 112 and the end portion of one of the third helical grooves 106. Subsequently, the coolant helically flows forward and backward through the coolant passage 108 provided in the outer surface of the plunger 12. Then, the coolant is discharged to an air passage (not shown) via the end portion of the other third helical groove 106 and the other connector 112.

Since the injection plunger 12 constructed as described above is employed in the second embodiment, the air coolant is flown through the coolant passage 108, so that the end portion 88 of the plunger 12 is cooled. Accordingly, the temperature of the plunger 12 can be adjusted within a wide range by controlling the amount of flowing of the air coolant and/or the pressure of supplying of the coolant. The cooling of the plunger 12 using the air coolant may be performed concurrently with the heating of the plunger 12 using the micro sheath heaters 92 embedded in the first helical grooves 90. However, generally, the cooling using the air coolant is performed in the state in which the supplying of electric current to the heaters 92 is stopped. Otherwise, the temperature of the plunger 12 may be held, or increased, by controlling the temperature of the air coolant to an appropriate value. A liquid such as water or oil may be employed as the coolant in place of the air coolant. In the case where a liquid is employed as the coolant, it is preferred that the metal sleeve 98 be provided by an axially continuous, single member, so that the fluid tightness between the plunger 12 and the sleeve 98 is improved.

In the screw-in-plunger injection apparatus as the second embodiment, the injection plunger 12 can be cooled by the air coolant, and the temperature of the plunger 12 can be prevented from being increased due to the internal heat generated due to the rotation of the screw 10 effected for controlling the amount of supplying of the resin material, plasticizing the resin material, or melting the same. In addition, the temperature of the resin material can be prevented from excessively increasing due to the internal heat, therefore defective products resulting from the excessive heating can be avoided. In particular, the present apparatus is advantageously used for injecting a resin material which easily decomposes, such as PVC, that is, it can successively inject such a resin material with stability. Since the screw-in-plunger injection apparatus has a double-wall structure in which the plunger 12 having the resin-material supply passage is located in the injection cylinder 14, it is more or less difficult for the supply passage to radiate the heat. However, the coolant passage 108 provided on the plunger 12 functions for reducing or eliminating the heat from the supply passage. Thus, the present apparatus can successively perform stable injection molding operations for a long time.

While the present invention has been described in its preferred embodiments, the invention should not be limited to the details of the illustrated embodiments.

For example, other sorts of drive devices such as electric motor may be employed in place of the hydraulic motor and/or the hydraulic cylinder devices used in the illustrated embodiments.

While in the illustrated embodiments the injection cylinder 14 is adapted to be opened by being rotated vertically upward, it is possible that the injection cylinder be adapted to be opened by being rotated in a horizontal direction about a vertical axis line.

It is to be understood that the present invention may be embodied with other changes, modifications, and improvements that may occur to those skilled in the art without departing from the spirit and scope of the invention.

What is claimed is:

1. A screw-in plunger injection apparatus comprising:
    an injection cylinder that has an inner hole and a tapered inner surface,
    a tubular injection plunger that has an inner hole and a portion of which is located in the inner hole of the injection cylinder and has, at one axial end of the injection plunger, a tapered outer surface corresponding to the tapered inner surface of the injection cylinder,
    a screw that extends in the inner hole of the injection plunger such that the screw is rotatable to feed a resin material into a plunger-injection storage space provided on a side of said one axial end of the injection plunger, the injection plunger and the screw being advanceable in an axial direction thereof in the inner hole of the injection cylinder to inject the resin material from the plunger-injection storage space, said screw being movable relative to said injection plunger in said axial direction, and
    a drive device that moves said screw relative to said injection plunger in said axial direction,
    wherein when said plunger is located at an advanced position thereof, said tapered outer surface of said one axial end of said injection plunger tightly abuts on said tapered inner surface of said injection cylinder, and wherein when said tapered outer surface of said one axial end of said injection plunger abuts on said tapered inner surface of said injection cylinder, said plunger-injection storage space is reduced to provide, on a side of an axial end of said screw, a reduced storage space to which the resin material is fed by the rotation of said screw and from which the resin material is injected by the advancement of said screw in said axial direction.

2. An apparatus according to claim 1, further comprising a movable base member which is fixed to the other axial end of said injection plunger which is opposite to said one axial end thereof, said movable base member being movable with said injection plunger relative to said injection cylinder, said movable base member supporting said drive device which moves said screw in said axial direction.

3. An apparatus according to claim 1, further comprising a plurality of hydraulic cylinder devices which move said injection plunger relative to said injection cylinder in said axial direction and which are provided between said injection plunger and said injection cylinder and around said injection plunger, said cylinder devices including respective piston rods which cooperate with each other to guide the movement of said screw in said axial direction.

4. An apparatus according to claim 1, wherein a ratio, $Sa/Sb$, of a cross-sectional area, $Sa$, of said inner hole of said injection cylinder to a cross-sectional area, $Sb$, of said inner hole of said injection plunger is not smaller than 2 and not greater than 8.

5. An apparatus according to claim 1, wherein a ratio, $Qa/Qb$, of a maximum volume of said plunger-injection storage space to a maximum volume, $Qb$, of said reduced storage space is not smaller than 3 and not greater than 10.

6. An apparatus according to claim 1, further comprising a micro sheath heater, wherein an axial end portion of said injection plunger which is located in said inner hole of said injection cylinder has a first helical groove formed in an outer circumferential surface thereof, said micro sheath heater being provided in said first helical groove.

7. An apparatus according to claim 6, further comprising a band heater which is provided on an outer circumferential surface of a remaining portion of said injection plunger other than said axial end portion thereof.

8. An apparatus according to claim 6, further comprising a protect sleeve which is externally fit on said axial end portion of said injection plunger to protect said micro sheath heater.

9. An apparatus according to claim 6, wherein said axial end portion of said injection plunger has a plurality of said first helical grooves, and a plurality of said micro sheath heaters being provided in said plurality of first helical grooves, respectively.

10. An apparatus according to claim 6, further comprising a thermocouple, wherein said axial end portion of said injection plunger has a second helical groove formed between a plurality of said first helical grooves, said thermocouple being provided in said second helical groove.

11. An apparatus according to claim 10, wherein said axial end portion of said injection plunger has a plurality of said second helical grooves, and a plurality of said thermocouples being provided in said plurality of second helical grooves, respectively.

12. An apparatus according to claim 1, further comprising a cooling device which cools an axial end portion of said injection plunger which is located in said inner hole of said injection cylinder.

13. An apparatus according to claim 12, wherein said cooling device comprises a helical coolant passage which is formed in said axial end portion of said injection plunger so as to extend in said axial direction, and a coolant which flows through said coolant passage.

14. An apparatus according to claim 1, further comprising a first heating device which heats an axial end portion of said injection plunger which is located in said inner hole of said injection cylinder, a second heating device which heats a tubular portion of said injection cylinder which defines said inner hole thereof into which an axial end portion of said injection plunger which is located, and a control device which controls said first heating device and said second heating device such that said tubular portion of said injection cylinder has a temperature lower than said axial end portion of said injection plunger.

15. An apparatus according to claim 1, further comprising a support base member, wherein said injection plunger and said screw are retractable, in said axial direction, to a retracted position thereof where said injection plunger and said screw are completely separate from said injection cylinder, said support base member supporting said injection cylinder such that said injection cylinder is pivotable about an axis line positioned on a side of an opening of said inner hole thereof through which an axial end portion of said injection plunger is inserted, so as to open and close said opening of said injection cylinder relative to said support base member.

16. An apparatus according to claim 15, further comprising a disengageable engaging device which engages said injection cylinder to inhibit said opening of said injection cylinder from being opened relative to said support base member, and a rattling preventing device which prevents rattling from occurring between said injection cylinder and said support base member, by applying, to said injection cylinder, a force to keep said injection cylinder away from said support base member in a state in which said engaging device inhibits said opening of said injection cylinder from being opened relative to said support base member.

17. An apparatus according to claim 15, further comprising a jack device which is provided between said support base member and said injection cylinder and which vertically upwardly transmits a supporting force of said support base member to said injection cylinder.

18. An apparatus according to claim 15, further comprising a plurality of guide rollers which are provided around an opening of said inner hole of said injection cylinder, wherein said surface of said one axial end of said injection plunger comprises a tapered surface, said tapered surface of said injection plunger being guided by said guide rollers when said axial end portion of said injection plunger is inserted in said inner hole of said injection cylinder.

19. An apparatus according to claim 15, further comprising a slide bush which is provided in an inner circumferential surface of an axial end of said injection cylinder which defines said opening of said inner hole of said injection cylinder, wherein said surface of said one axial end of said injection plunger comprises a tapered surface, said tapered surface of said injection plunger being guided by said slide bush when said axial end portion of said injection plunger is inserted in said inner hole of said injection cylinder.

20. An apparatus according to claim 1, further comprising:
    a supply device that supplies the resin material to the injection plunger; and
    preventing means for preventing the resin material from flowing back from the reduced storage space toward the supplying device when the resin material is injected from the reduced storage space by the advancement of the screw relative to the injection plunger in said axial direction.

21. An apparatus according to claim 20, wherein said preventing means comprises a ring valve that is provided between the screw and the injection plunger.

* * * * *